May 16, 1967  L. D. ECKERMANN  3,319,976

SPLASH GUARD OR MUD FLAP MEANS

Filed April 26, 1965

INVENTOR.
LOUIS D. ECKERMANN

BY John H. Widdowson
ATTORNEY

United States Patent Office 3,319,976
Patented May 16, 1967

3,319,976
SPLASH GUARD OR MUD FLAP MEANS
Louis D. Eckermann, 420 N. Park,
Wellington, Kans. 67152
Filed Apr. 26, 1965, Ser. No. 450,915
7 Claims. (Cl. 280—154.5)

This invention relates to stabilized splash guards or mud flaps for use on wheeled vehicles, and to means for stabilizing the movement of splash guard or mud flaps when in use on wheeled vehicles, preferably by depending resilient means behind the splash guard or mud flap.

Splash guards have been in use on wheeled vehicles for many years, for the purpose of deflecting mud and road spray being thrown from the wheels of a vehicle. This spray constitutes a hazard to the operation of other vehicles in the immediate vicinity and more particularly to the rearward of such a moving vehicle. Many States require by law that certain types of wheeled vehicles maintain adequate splash guards at all times during their operation as a matter of public safety. Splash guards are customarily made of a combination of fibrous and rubber-like material and are mounted on wheeled vehicles so that they depend to the rearward of the wheels. While a vehicle is being operated on a road or highway, the splash guards tend to assume a horizontal rather than a vertical position by reason of the air movement during operation of the vehicle. When the splash guards are in a position other than vertical, they cannot effectively control the splashing effect created by the moving wheels of the vehicle. If splash guards are allowed to move freely in the air stream of the vehicle, the continuous flexing movement of the splash guard weakens the flexible material from which it is made to the extent that its useful life is substantially reduced.

The prior art splash guards have proven generally unsatisfactory. Some types include a complicated combination of holding means wherein the attempt has been made to hold the splash guard in a substantially fixed position. However, these devices are expensive to fabricate, difficult to install and are subject to damage and breakage in the normal operation of a vehicle utilizing such guards as when said vehicle is backed into a solid obstruction such as a loading dock. A further difficulty with prior art splash guard stabilizing means is the difficulty encountered in attaching a complicated device on the vehicle utilizing the splash guard and consequently a like difficulty in changing the splash guard flexible material on said vehicle when stabilized by a complicated device.

I have invented new stabilizing means for a mud flap or splash guard mounted on a wheeled vehicle. The new stabilizing means of the invention has means to connect resilient means to the vehicle rearward of the mud flap or splash guard thereon. Resilient means are employed and it is mountable on the means to connect same to the vehicle. When mounted the resilient means depends downward from the vehicle a distance and in such fashion so as to in operation restrain the mud flap or splash guard from unduly swinging in a rearward direction from the vehicle.

The new stabilized mud flap or splash guard of my invention is used in connection with a wheeled vehicle. The stabilized mud flap or splash guard has a flexible material, and means for mounting this flexible material on the vehicle. There is employed means for mounting resilient means immediately rearward of the flexible material when mounted on the vehicle. Resilient means which is mountable thereon are used, and when the resilient means is mounted on a vehicle it depends downward a distance and in such fashion to in operation restrain the flexible material from unduly swinging in a rearward direction from the vehicle.

The new type splash guard of my invention which, has been provided overcomes the disadvantages of the prior art devices. More specifically, the new type splash guard lends itself to easy installation on any type of vehicle, is economical to produce and by reason of its resilient and flexible construction is not easily subject to damage while in use on said vehicle. The new stabilizing means for splash guards or mud flaps of my invention is easy to make and install on vehicles, and gives long and efficient use in practice.

It is an object of this invention to provide a new stabilized mud flap or splash guard for a vehicle having wheels.

Another object of this invention is to provide new stabilizing means for splash guards or mud flaps on vehicles.

A further object of this invention is to provide a new stabilized mud flap or splash guard with a resilient means for stabilizing a mud flap or splash guard.

Another object of this invention is to provide a new stabilized mud flap or splash guard and stabilizing means therefor which is simple and easy to install.

Still another object of this invention is to provide a new stabilized mud flap or splash guard which is economical to fabricate.

Another object of this invention is to provide a new stabilizing mud flap or splash guard which is easily adaptable to all types of wheeled vehicles.

Yet another object of this invention is to provide a stabilized mud flap or splash guard which is not easily damaged while in use.

Various other objects, advantages and features of the invention will become apparent to those skilled in the art from reading this disclosure.

Drawings accompany and are a part of this disclosure. These drawings depict preferred specific embodiments of the invention, and it is to be understood that these drawings are not to unduly limit the scope of the invention. In the drawings, FIG. 1 is a rear elevational view of a preferred specific embodiment of a stabilized mud flap or splash guard of my invention.

Figure 1:
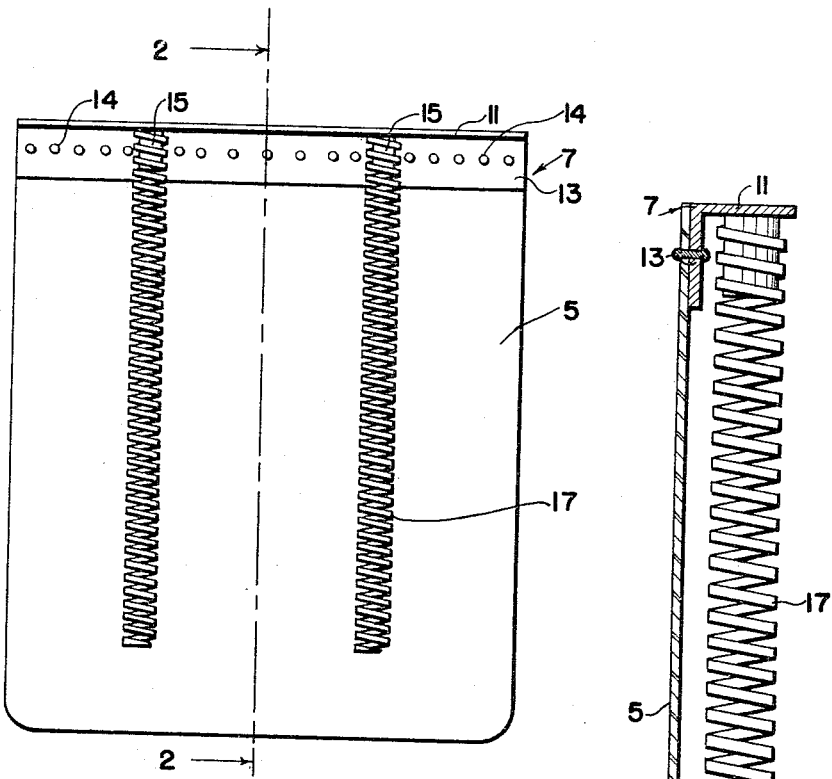
Figure 2:
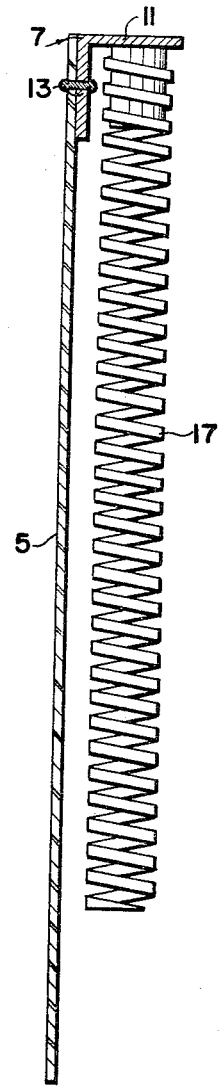
FIG. 2 is a vertical cross sectional view of same on an enlarged scale.
Figure 3:
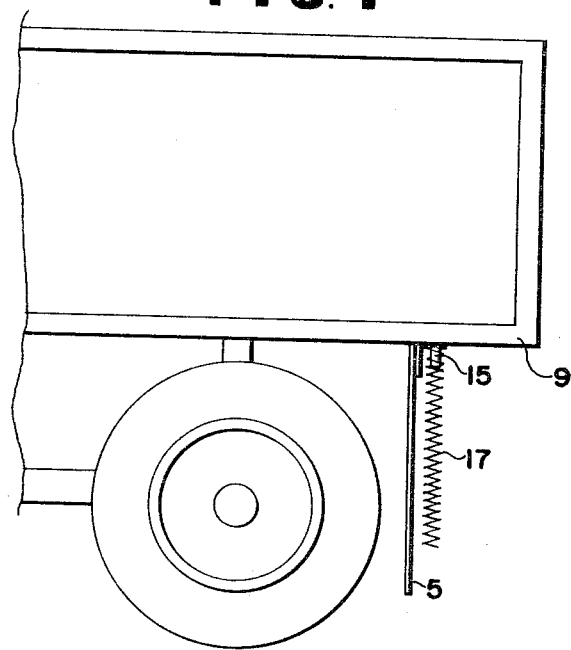
FIG. 3 is a side elevational view showing the stabilized mud flap or splash guard as preferably mounted on a vehicle.

In the following is a discussion and description of the invention made with reference to the accompanying drawings whereon the same reference numerals are used to indicate the same or similar parts and/or structure. The discussion and description is of preferred specific embodiments of new stabilizing means for a mud flap or splash guard of the invention, and of preferred specific embodiments of the new stabilized mud flap or splash guard of my invention, and it is to be understood that the discussion and description is not to unduly limit the scope of the invention.

Referring now to the drawings in detail, FIG. 1 of the drawings shows a sheet of flexible material 5 which is the mud flap or splash guard. This part can be composed of any suitable flexible material such as rubber or a rubber-like substance or a combination of fibers and rubber-like material and textiles and rubber-like material and the like. The flexible material is preferably connected to the vehicle by a length of angle iron 7 which is connected to the vehicle 9 by suitable means such as welding, bolting or riveting, or the like, in such fashion that one of the two portions of the angle iron 11 is in a horizontal plane and projects rearwardly in relation to the vehicle and the other portion of the angle iron 13 is in a vertical plane and projects downwardly.

The sheet of flexible material is connected to the downward projecting portion of the angle iron 13 by suitable means such as bolting, riveting, and the like, indicated at 14. Two spaced bosses 15 are rigidly mounted on the horizontal portion of the angle iron 11 by suitable means such as welding means, screw means, etc., or the like, said bosses being of a suitable rigid material such as steel, aluminum alloy, or the like. The bosses are preferably spaced equidistant from the vertical portion of the angle iron 13 and laterally spaced along said angle iron horizontal portion 11 and extend downward a distance less than the projection of the vertical portion of the angle iron 13. Connected to each boss 15 is a helical spring 17 made of any suitable resilient material, but preferably out of spring steel. The springs 17 should be such a length so as to depend downward along the face or rearward side of flexible material 5 a distance more than one-half but less than the full length of said mud flap or splash guard, preferably a distance of 65 to 90 percent the length of the sheet of flexible material, and having an inside diameter slightly less than the diameter of the boss 15 so that the spring 17 when mounted upon the boss 15 is under tension. Each spring 17 is then concentrically connected to each boss 15 by suitable means such as welding. The bosses 15 with springs 17 attached are so positioned longitudinally and transversely on the horizontal portion of said angle iron 11 so that in operation in a vehicle the spring 17 restrains the mud flap or splash guard from unduly swinging in a rearward direction from the moving vehicle.

In the vent that it is desirable to connect the stabilizing means for a splash guard or mud flap on a vehicle already equipped with flexible material 5, the bosses 15 with the springs 17 connected thereto can be connected directly to the wheeled vehicle 9 by any suitable means such as welding, bolting, screw means, or the like. The bosses 15 with springs 17 connected thereto being positioned on said vehicle immediately rearward of flexible material 5, equidistant from said flexible material and so positioned longitudinally and transversely in relation to the top of said flexible material 5 so as to in operation restrain said flexible material 5 from unduly swinging in a rearward direction during the operation of the vehicle.

The foregoing discussion and description has been made in connection with preferred specific embodiments of the mud flap or splash guard or stabilizing means of the invention. However, it is to be understood that the discussion and description is only intended to illustrate and teach those skilled in the art how to practice the invention, and such is not to unduly limit the scope of the invention, which is defined in the claims set forth hereinafter.

I claim:

1. A stabilized mud flap or splash guard for a vehicle having rear wheels comprising, a sheet of flexible rubber-like material in a generally rectangular shape swingingly and longitudinally suspendable at its upper end from a vehicle rearward of and adjacent to the wheels or tires of said vehicle, means to connect said flexible splash guard to said vehicle comprising, a length of angle iron transversely connectible to said vehicle rearward of and adjacent to the wheels or tires of the vehicle with one of the two portions of said angle iron in a horizontal plane and projecting rearwardly in relation to the vehicle and the other portion of said angle iron in a vertical plane and projecting downwardly from said vehicle, said sheet of flexible material attached to said vertically projecting portion of said angle iron to depend therefrom when mounted on said vehicle, two spaced bosses rigidly mounted on said horizontal portion of said angle iron equidistant from said vertical portion of said angle iron, said bosses extending a distance less than the projection of said vertical portion of said angle iron, and each of said bosses having a straight helical spring concentrically and weldably mounted thereon to depend therefrom when mounted on said vehicle, said spring engaging said bosses under tension with the inner ends of said springs in engagement with said horizontal portion of said angle iron and extending from said bosses a distance of 65 to 90 percent of the length of said sheet of flexible material, said bosses and springs positioned longitudinally and transversely on said angle iron rearward of said flexible splash or mud flap guard to in operation restrain said mud flap or splash guard from unduly swinging in a rearward direction from said vehicle.

2. A stabilized mud flap or splash guard for a vehicle having wheels comprising, a sheet of flexible material in a generally rectangular shape suspendible from the frame of a vehicle rearward of and adjacent to the wheels or tires of said vehicle, means to connect said flexible splash guard to said frame of the vehicle comprising, a length of angle iron transversely connectible to said frame of said vehicle rearward of and adjacent to the wheels or tires of the vehicle with one of the two portions of said angle iron in a horizontal plane and projecting rearwardly in relation to the vehicle and the other portion of said angle iron in a vertical plane and projecting outwardly from said vehicle frame, said sheet of flexible material attached to the said vertically projecting portion of said angle iron to depend therefrom when mounted on said vehicle, two spaced bosses rigidly mounted on said horizontal portion of said angle iron, and each of said bosses having a helical spring concentrically mounted thereon to depend therefrom when mounted on said vehicle, said springs extending from said bosses a distance of 65 to 90 percent of the length of said sheet of flexible material, and said bosses and said springs positioned longitudinally and transversely on said angle iron rearward of said flexible splash or mud guard to restrain said mud or splash guard from unduly swinging in a rearward direction from said vehicle.

3. A stabilized mud flap or splash guard for a vehicle having wheels comprising, a sheet of flexible material suspendible from the frame of a vehicle rearward of and adjacent to the wheels or tires of said vehicle, means connected to said flexible material having a portion connectible to said vehicle rearward of and adjacent to the wheels or tires of the vehicle to suspend said flexible material thereon, spaced mounting means mounted on said means connected to said flexible material adjacent to said flexible material, said mounting means having resilient means mounted thereon to depend therefrom a distance more than one-half but less than the full length of said sheet of flexible material and spaced therefrom in such fashion as to extend downward near the rearward portion of the flexible material so as to in operation restrain said sheet of flexible material from unduly swinging in a rearward direction from said vehicle without restricting forward movement thereof.

4. Stabilizing means for a mud flap or splash guard on a wheeled vehicle comprising, two spaced bosses rigidly mounted on said wheeled vehicle immediately rearward of said mud flap or splash guard, and each of said bosses having a straight helical spring mounted thereon to depend therefrom a distance of 65 to 90 percent of the length of said mud flap or splash guard, said bosses and springs positioned longitudinally and transversely on said vehicle immediately rearward of the flexible splash or mud flap guard so that during operation of the said vehicle the said springs will restrain the said mud flap or splash guard from unduly swinging in a rearward direction from said vehicle.

5. Stabilizing means for a mud flap or splash guard mounted on a wheeled vehicle comprising, means to connect resilient means to said vehicle when mounted thereon immediately rearward of said mud flap or splash guard mounted on said vehicle and resilient means mountable on said means to connect and when mounted on said vehicle to depend downward therefrom a distance more than one-half but less than the full length of said mud flap or splash guard, said resilient means spaced adjacent said mud flap or splash guard in such fashion that the said resilient means will restrain the said mud flap or splash guard from unduly swinging only in a rearward direction from said vehicle during operation of same.

6. A stabilized mud flap or splash guard for a vehicle having wheels comprising, flexible material, means for mounting said flexible material on said vehicle, means for mounting resilient means immediately rearward of said flexible material when mounted on said vehicle, and resilient means mountable on said means for mounting resilient means spaced from said mud flap or splash guard and when mounted to depend downward from said vehicle a distance and in such fashion so as to in operation restrain said flexible material from unduly swinging in a rearward direction from said vehicle.

7. Stabilizing means for a mud flap or splash guard mounted on a wheeled vehicle comprising, means to connect resilient means to said vehicle rearward of said mud flap or splash guard, and a spring member mountable on said means to connect in a spaced relationship to said mud flap or splash guard and when mounted on said vehicle to depend downward therefrom a distance and in such fashion so as to in operation restrain said mud flap or splash guard from unduly swinging in a rearward direction from said vehicle.

References Cited by the Examiner

UNITED STATES PATENTS

| 3,091,478 | 5/1963 | Ambli | 280—154.5 |
| 3,244,432 | 4/1966 | Ambli | 280—154.5 |

FOREIGN PATENTS

| 5,393 | 5/1921 | Netherlands. |

BENJAMIN HERSH, *Primary Examiner.*

M. S. SALES, L. D. MORRIS, *Assistant Examiners.*